United States Patent
Polikarpus et al.

(10) Patent No.: US 6,800,158 B2
(45) Date of Patent: Oct. 5, 2004

(54) METHOD OF MAKING A SENSOR AND THE PRODUCT PRODUCED THEREFROM

(75) Inventors: Kaius Kiiren Polikarpus, Grand Blanc, MI (US); Walter Thomas Symons, Grand Blanc, MI (US); Kerry J. Gross, New Lothrop, MI (US)

(73) Assignee: Delphi Technologies, Inc., Troy, MI (US)

( * ) Notice: Subject to any disclaimer, the term of this patent is extended or adjusted under 35 U.S.C. 154(b) by 65 days.

(21) Appl. No.: 09/767,925

(22) Filed: Jan. 23, 2001

(65) Prior Publication Data

US 2002/0134487 A1 Sep. 26, 2002

(51) Int. Cl.[7] .................... C04B 35/106; G01N 27/406
(52) U.S. Cl. ................. 156/89.12; 156/89.16; 264/618; 204/426; 501/105
(58) Field of Search ................. 204/424, 426, 204/429; 156/89.11, 89.12, 89.16; 264/614, 618, 681; 501/103, 105, 134, 152

(56) References Cited

U.S. PATENT DOCUMENTS

| | | |
|---|---|---|
| 4,219,359 A | 8/1980 | Miwa et al. |
| 4,221,650 A | 9/1980 | Friese et al. |
| 4,266,979 A | 5/1981 | Miyoshi et al. |
| 4,542,110 A | 9/1985 | Nakada et al. ............. 501/103 |
| 4,897,174 A * | 1/1990 | Wang et al. ................ 204/425 |
| 5,045,511 A | 9/1991 | Bosomworth et al. ........ 501/85 |
| 5,087,595 A | 2/1992 | Marsh et al. ............... 501/105 |
| 5,242,873 A | 9/1993 | Singh et al. ................ 501/103 |
| 5,795,545 A | 8/1998 | Koripella et al. ............ 422/94 |
| 5,849,165 A * | 12/1998 | Kojima et al. .............. 204/429 |
| 5,968,673 A * | 10/1999 | Aizawa et al. .............. 428/688 |
| 6,121,177 A | 9/2000 | Guigonis et al. ............ 501/105 |
| 6,258,233 B1 * | 7/2001 | Sugiyama et al. ........... 204/424 |
| 6,346,178 B1 * | 2/2002 | Lankheet .................... 204/424 |
| 6,562,747 B2 * | 5/2003 | Symons et al. .............. 501/103 |
| 2003/0006139 A1 * | 1/2003 | Noda et al. ................. 204/424 |

FOREIGN PATENT DOCUMENTS

| | | |
|---|---|---|
| DE | 4107869 | 9/1991 |
| EP | 0942279 | 9/1999 |

OTHER PUBLICATIONS

Practical Handbook of Materials Science, CRC Press, Inc., 1989, pp. 299,31,311.*
http://www.zrchem.com/zelem.htm, 2 pages, dat Oct. 2, 2000.
http://tosoh.com/EnglishHomePage/tcdiv/tcdadcer.htm, 5 pages, Nov. 17, 2000.

* cited by examiner

*Primary Examiner*—Kaj K. Olsen
(74) *Attorney, Agent, or Firm*—Jimmy L. Funke (57) ABSTRACT

A conductive co-fired body for an electrochemical cell for an exhaust sensor comprises zirconia, yttrium oxide, and alumina. The body comprises about 15 to about 30 weight % monoclinic phase zirconia. This produces an electrochemical cell having low impedance wherein the zirconia body and alumina body are co-fired. One method for manufacturing the electrochemical cell comprises combining zirconia, yttria, and alumina with solvent and dispersant to form a mixture. After, binder is added to the mixture which is then de-aired and cast onto a tape surface. The tape is dried, metallized, and laminated to an unfired alumina surface. The structure is then co-fired to form a body for said electrochemical cell.

21 Claims, 5 Drawing Sheets

METHOD OF MAKING A SENSOR AND THE PRODUCT PRODUCED THEREFROM

TECHNICAL FIELD

The invention relates generally to exhaust sensors for automotive applications. Particularly, the present invention relates to an exhaust sensor having a high conductivity co-fire zirconia body.

BACKGROUND OF THE INVENTION

The automotive industry has used exhaust sensors in automotive vehicles for many years to sense the oxygen content of exhaust gases. For example, sensors are used for alteration and optimization of the air to fuel ratio for combustion.

For oxygen sensing, solid electrolyte sensors are used to measure oxygen partial pressure differences between an unknown gas sample and a known gas sample. A sensor typically has a conductive solid electrolyte between porous electrodes. In the use of a sensor for automotive exhaust, the unknown gas is exhaust and the known gas (i.e., reference gas) is usually atmospheric air because oxygen content in the air is relatively constant and readily accessible. This type of sensor is based on an electrochemical galvanic cell operating in a potentiometric mode to detect the relative amounts of oxygen present in an automobile engine's exhaust. When opposite surfaces of this galvanic cell are exposed to different oxygen partial pressures, an electromotive force (emf) is developed between the electrodes according to the Nerst equation:

$$E = \left(\frac{RT}{4F}\right)\ln\left(\frac{P_{O_2}^{ref}}{P_{O_2}}\right)$$

where:

E=electromotive force
R=universal gas constant
F=Faraday constant
T=absolute temperature of the gas
$P_{O_2}^{ref}$=oxygen partial pressure of the reference gas
$P_{O_2}$=oxygen partial pressure of the exhaust gas For proper sensor operation, interfacial impedance of the sensor's electrochemical cell should be maintained within an effective temperature range which is dependent upon the cell's composition. With prior art cell formulations, some would often have excessively high electrode/electrolyte interfacial impedance after being kiln fired (firing). The cause of the poor impedance performance of the cells is related to the impurity content of the cell materials, cleanliness in manufacture, and sintering temperature.

Low electrochemical cell impedance is achievable with a variety of co-synthesized yttria stabilized zirconia bodies currently available or described in literature. Some of these have demonstrated a high ionic conductivity, high microstructural homogeneity, and good low temperature stability. However, these materials are incapable of being laminated or otherwise joined to an alumina body in the green (unfired) stage followed by a firing to a high density level (theoretical) of about 93% or higher. These materials typically fail by a crack or separation at or associated with the alumina body/zirconia body interface because of sintering shrinkage and/or thermal expansion mismatch in the firing manufacturing process. Some prior art zirconia body formulations, however, are compatible with some high alumina body formulations. This is primarily because these zirconia body formulations convert about 20 weight % to a monoclinic phase from a tetragonal phase while cooling from the firing process between about 650° C. and about 350° C. However, these formulations, as stated above, cannot be made into an electrochemical cell with low, stable, electrode impedance.

SUMMARY OF THE INVENTION

The deficiencies of the above-discussed prior art are overcome or alleviated by the method of manufacturing a zirconia-alumina body, and a sensor of the present invention. The method of manufacturing the zirconia-alumina body comprises: mixing zirconia, yttria, and alumina with at least one solvent to form a mixture; drying said mixture; laminating said dried mixture to an unfired alumina surface; and co-firing to form the zirconia-alumina body, wherein said zirconia-alumina body comprises about 1 weight % to about 45 weight % monoclinic phase zirconia, based upon the total weight of the zirconia.

The method of making the sensor comprises: mixing zirconia, yttria, and alumina with at least one solvent and at least one dispersant to form a mixture; drying said mixture to form an unfired zirconia body; disposing an electrode on each side of said unfired zirconia body; connecting each electrode to an electrical lead; disposing said unfired zirconia body adjacent to an unfired alumina surface to form an unfired zirconia-alumina body, wherein one of said electrodes is disposed between said zirconia body and said alumina body; and co-firing to form the sensor, wherein the co-fired zirconia-alumina body comprises about 1 weight % to about 45 weight % monoclinic phase zirconia, based upon the total weight of the zirconia.

The above-discussed and other features and advantages of the present invention will be appreciated and understood by those skilled in the art from the following detailed description and drawings.

BRIEF DESCRIPTION OF THE DRAWINGS

The present invention will now be described, by way of example only, with reference to the accompanying drawings, which are meant to be exemplary, not limiting, and wherein like elements are numbered alike in several Figures, in which.

DETAILED DESCRIPTION OF THE PREFERRED EMBODIMENT

The device explained herein is a sensor for sensing an unknown gas using a known reference gas. The formulations disclosed herein are related to the production of an oxygen sensor. However, it should be understood that other gases could be sensed depending on the unknown gas and known reference gas, and the composition and structure of the electrode materials.

The sensor has a solid electrolyte, such as yttria doped zirconia or the like, that is bound by at least two electrodes, and a series of substrates such as alumina tapes. The zirconia comprises up to about 45 weight percent (weight %) monoclinic phase, based upon the total weight of the zirconia, which enables compatibility with the alumina tapes. In operation, the first electrode is exposed to the sensing atmosphere such as exhaust gas. The second electrode is exposed to a reference gas such as oxygen. Usually, one or more heaters are attached to the device to keep the device at a sufficient temperature for sensing operation. The emf measured from the two electrodes, due to the galvanic potential, represents the partial pressure difference between the sensing atmosphere and the reference gas. For an automobile exhaust system, this difference is indicative of the oxygen content in the exhaust gas.

Figure 1:
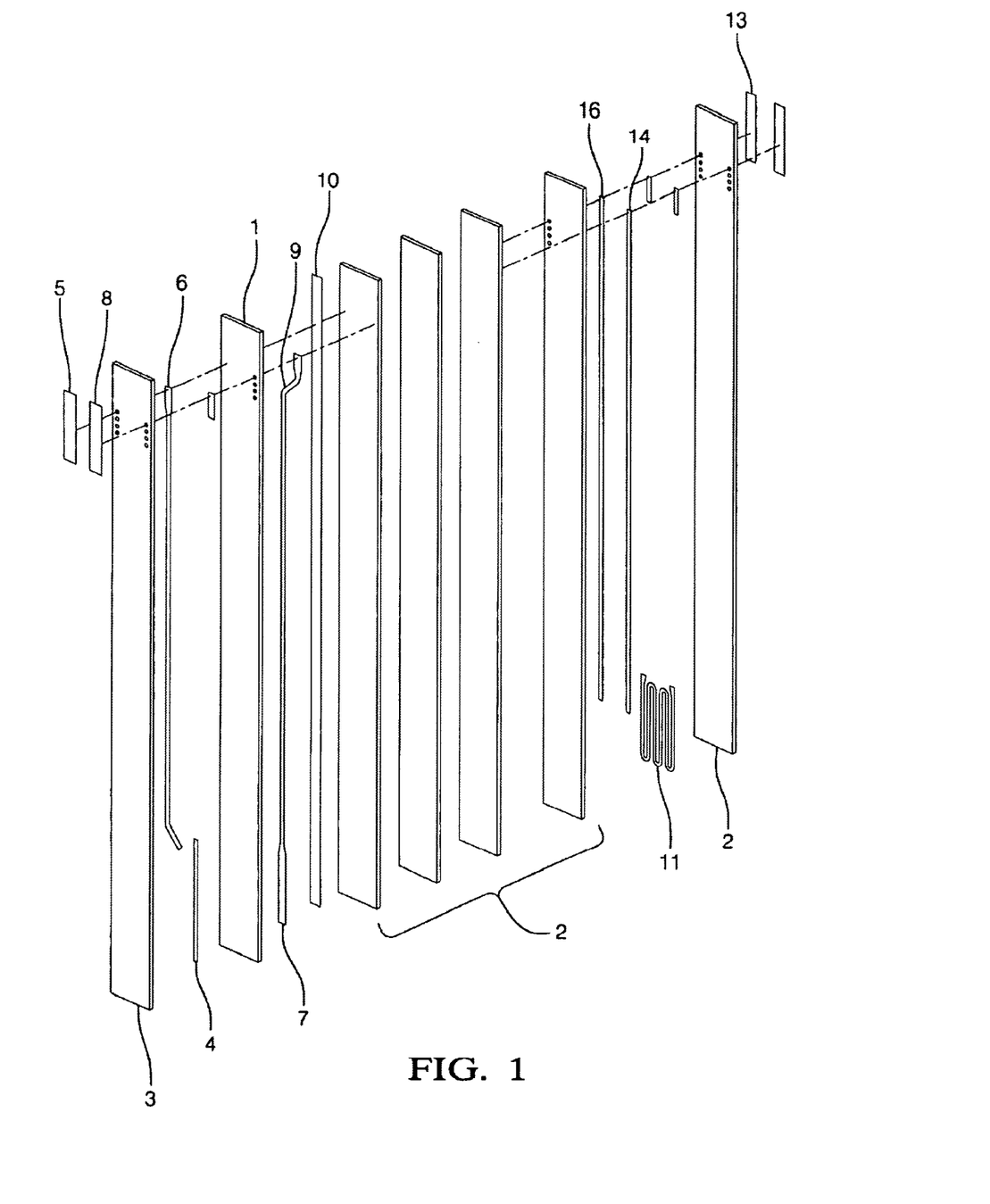
FIG. 1 is a layout of a planar oxygen sensor in accordance with the present invention.

Referring to FIG. 1, an example of a planar oxygen sensor 17 is shown. For this arrangement, a solid electrolyte tape 1 is yttria doped zirconia, tapes 2 are alumina, and tape 3 is an alumina-zirconia mixed tape which provides particulate protection. Under tape 3 is the exhaust gas sensing electrode 4 which connects to the contact pad 5 through the lead 6, while the reference electrode 7, which connects to the pad 8 through lead 9, is disposed in fluid communication with reference chamber 10. Proximate alumina tapes 2, heater 11 is connected to contact pad 13, which is connected to corresponding leads 14 and 16. The electrodes, leads, contact pads, and heater can comprise materials conventionally employed in the sensors, such as platinum, palladium, rhodium, osmium, iridium, ruthenium, and other metals, metal oxides, and other materials, as well as alloys and mixtures comprising at least one of the foregoing. Furthermore, other conventional components may be employed such as a lead gettering layer, ground plane, and the like.

A formulation for producing a conductive co-fired body, for example for tape 1 above, comprises. based upon the total weight of the co-fired body, up to about 95 mole % zirconia. ($ZYO_2$), with about 85 to about 93 mole % preferred; up to about 10 mole % yttrium oxide ($Y_2O_3$), with about 3 to about 7 mole % preferred; and up to about 10 mole % alumina ($Al_2O_3$), with about 3 to about 7 mole % preferred; wherein after processing and firing, about 1 weight % to about 45 weight %. of the zirconia is monoclinic phase zirconia, with about 25 weight % to about 30 weight % preferred, and about 18 weight % to about 25 weight % especially prefferred, balance cubic and tetragonal phases. Preferably, a sufficient amount of the zirconia is in the monoclinic phase such that the sintering curve of the zirconia body tape and the alumina body tape (measured individually via a sintering dilatometer method), have a sintering mismatch of about 5% or less. The yttrium oxide added here acts as a stabilizer. The zirconium oxide is generally purer than that used in prior art formulations, e.g., the zirconia comprises less than about 100 parts per million (ppm) of each of silica, sodium, calcium, magnesium, iron, titanium, chlorine, and other impurities, with a total impurity amount of less than about 1,000 ppm more preferred, and a total of less than about 500 ppm more preferred, and a total of less than about 300 ppm especially preferred. By having minimal impurity levels, especially silicon (Si), in the zirconia body batch ingredients, the effects of diffusion of impurity species to the electrode/electrolyte interface are minimized. This helps attain low overall cell impedance; for example, an electrode resistivity about 10 ohm-cm or lower at 800° C. in air, and a total cell bulk DC resistivity about 250 ohm-cm or lower at 800° C. in air.

In theory, the zirconia body, which generally is in tetragonal, monoclinic, or cubic phase, is compatible with the alumina body because the fired zirconia body phase chemistry includes up to about 45 weight % of monoclinic, balance cubic and tetragonal phases. While the monoclinic phase content reduces the ionic conductivity of the electrochemical cell, it provides critical structural compatibility with alumina bodies. This thereby enables the production of co-fired, monolithic, hybridized zirconia body/alumina body structures. Furthermore, this formulation enables stress relief upon cooling of co-fired alumina/zirconia elements, thereby inhibiting cracking or separation failures.

Figure 5:
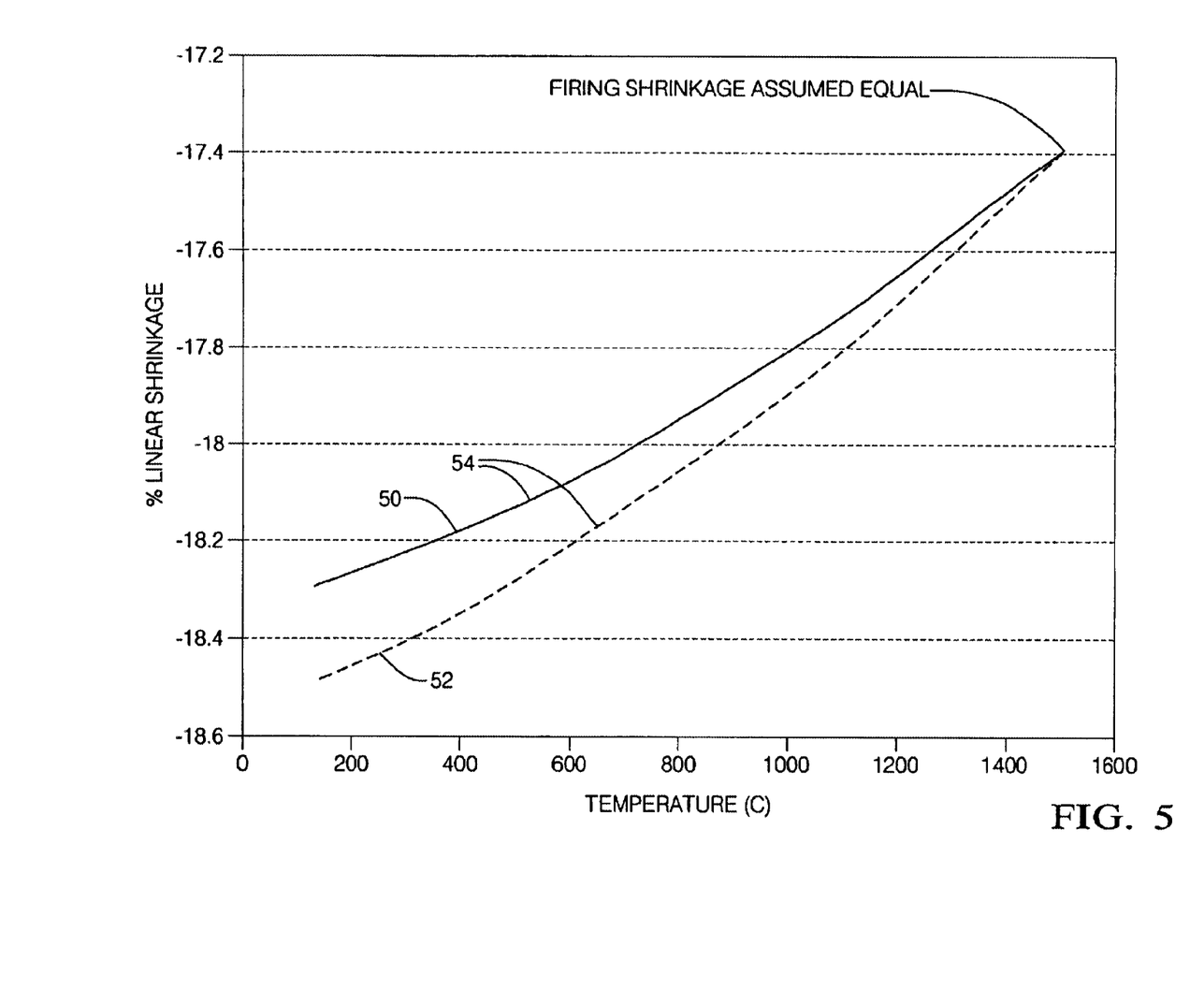
FIG. 5 is a graphical illustration of thermal expansion and contraction for an alumina body, cubic/tetragonal-zirconia body, and one embodiment of a zirconia body of the present invention comprising about 22 weight % monoclinic phase zirconia.

Referring to FIG. 5, line 50 represents alumina body contraction on cooling, line 52 shows a cubic/tetragonal zirconia body on cooling, and line 54 shows the cooling curve of a zirconia body comprising about 22 weight % monoclinic phase. Note how, around 500° C., line 54 suddenly rises, showing the volumetric expansion of the tetragonal to monoclinic transformation. The mismatch of line 52 (which is a formulation like Sample 1 below) becomes worse relative to the alumina, line 50, as cooling continues.

The process for producing a conductive co-fired body includes forming a batch mixture of zirconia, yttria, and alumina, along with solvent(s) such as xylenes, ethanol, and the like, and/or dispersant(s) such as phosphate ester, Menhaden fish oil, sulfosuccinate, castor oil, and the like. This mixture is milled for a sufficient period of time to obtain a substantially homogeneous mixture, e.g., typically about 4 to about 12 hours. Thereafter, binder(s) (such as polyvinyl butyral, poly methyl methacrylate, poly vinyl formol, and the like), and plasticizer(s) (such as butyl benzyl phthalate, glycols (e.g., polyethylene glycol, and the like) and phthalates, (e.g., dimethyl phthalate, octyl phthalate, and the like) and others), can optionally be added to the mixture. The mixture is preferably mixed, e.g., milled, for an additional period of time to obtain a substantially homogeneous mixture, e.g., typically up to about 8 hours or so, to produce a slurry. The slurry produced is then preferably de-aired, which is typically achieved by pulling a vacuum on the slurry for up to about 3 minutes or so.

After de-airing, the slurry is formed into the tape by a known method, e.g., it is cast using a known doctor blade tape casting method. Typically, the slurry will be cast onto a carrier such as polyester film. Once the tape has been cast, the tape is allowed to dry thereby producing unfired zirconia body tape. This tape may then be metallized using a thick film screen printing process, or other technique, to dispose the electrodes on the tape (one on each side). The tape is then laminated to an unfired alumina body tape which typically has up to about 96 weight % alumina body, with up to about 98 weight % preferred; and up to about 10 weight % flux, with about 4 weight % to about 6 weight % flux preferred.

The flux may be a mineral based composition including clay, talc, calcium carbonate, and the like, and may be used in a "fritted" form (pre-reacted to form a glass, which is then ground.) A preferred flux is a frit containing silica, lanthanum oxide, yttrium oxide, boron oxide, alumina, and other metal oxides, as well as mixtures comprising at least one of the foregoing.

The laminated structures are co-fired in an air atmosphere kiln at a sufficient temperature to achieve closed porosity of the dense ceramics (typically about 1,375° C. to about 1,550° C., with a temperature of about 1,500° C. to about 1,530° C. preferred; with a hold for up to about 2 hours or so). Once fired, the co-fired body is disposed next to the remainder of the desired sensor components.

Alternatively, all components can be assembled prior to firing, and then co-fired in a single process to form an integral sensor. In this embodiment, for example, a protective layer may be disposed adjacent to one electrode while the alumina body is disposed adjacent to the other electrode. Other layers which may also be employed include a lead gettering layer disposed between the protective layer and the electrode, and support layers disposed adjacent to the opposite side of the alumina body. Disposed within the support layers can be a ground plane and a heater. Necessary leads, contacts, and vias are also formed on the appropriate layers to connect the electrodes, ground plane and heater(s) accordingly, as is well known in the art.

Examples of formulations for the zirconia body are shown in Tables I and II, wherein Table I shows the total slurry formulation and Table II shows the inorganic batch weight percentages.

average DC current and resistance of the Samples were measured by applying 0.1 volts (V) to 1.1V, at 0.1V increments, with about one minute dwell at each voltage. A precision resistor was used in series for a voltage measurement. Current density and resistivity were calculated with the cell thickness and electrode area. The Samples were measured in air at 800° C. initially, and after air aging at 800° C. for 24 and 48 hours.

Figure 2:
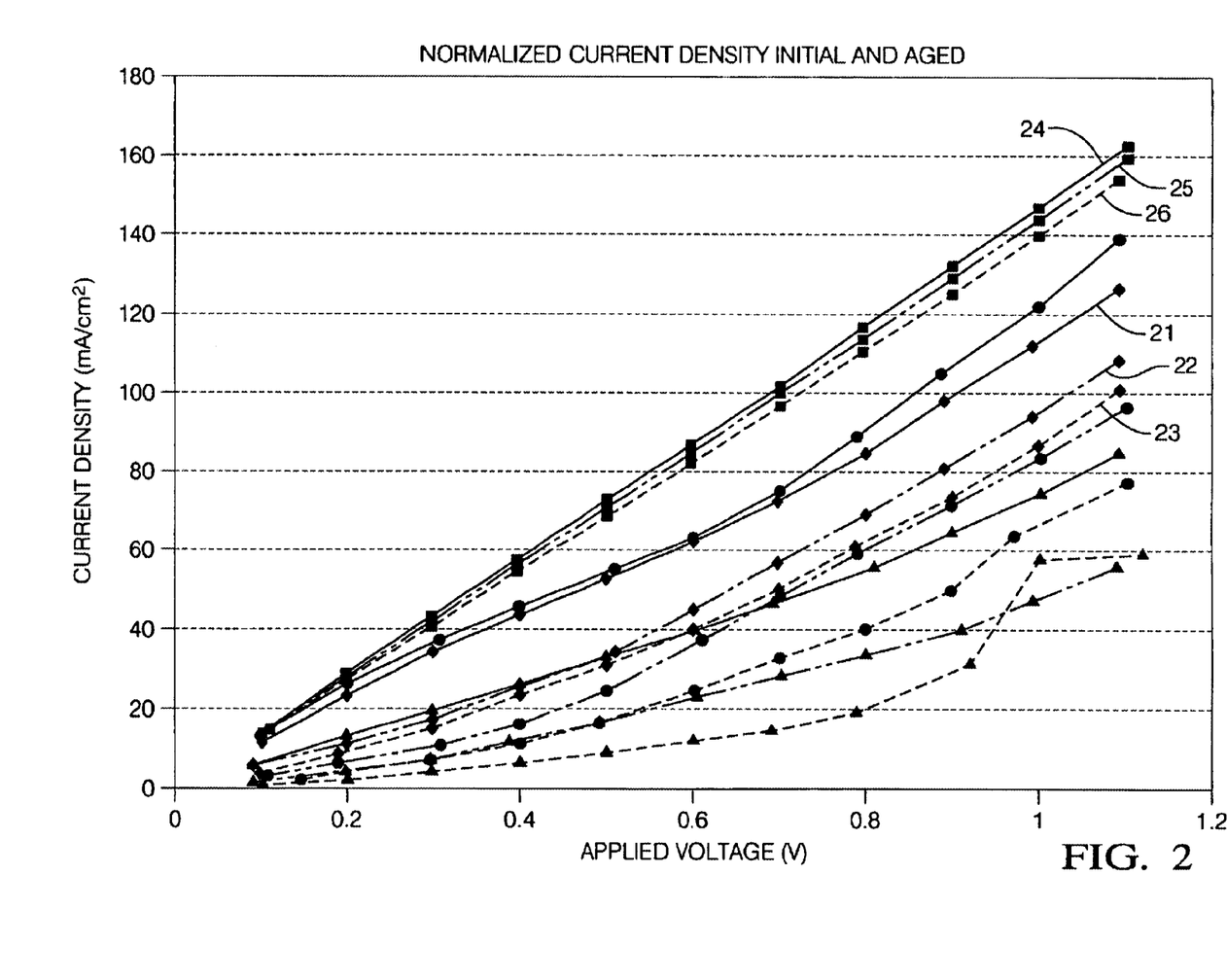
FIG. 2 is a graphical illustration of normalized current density showing a variable current density over an applied voltage for fresh samples and the same samples aged in 800° C. in air.
Figure 3:
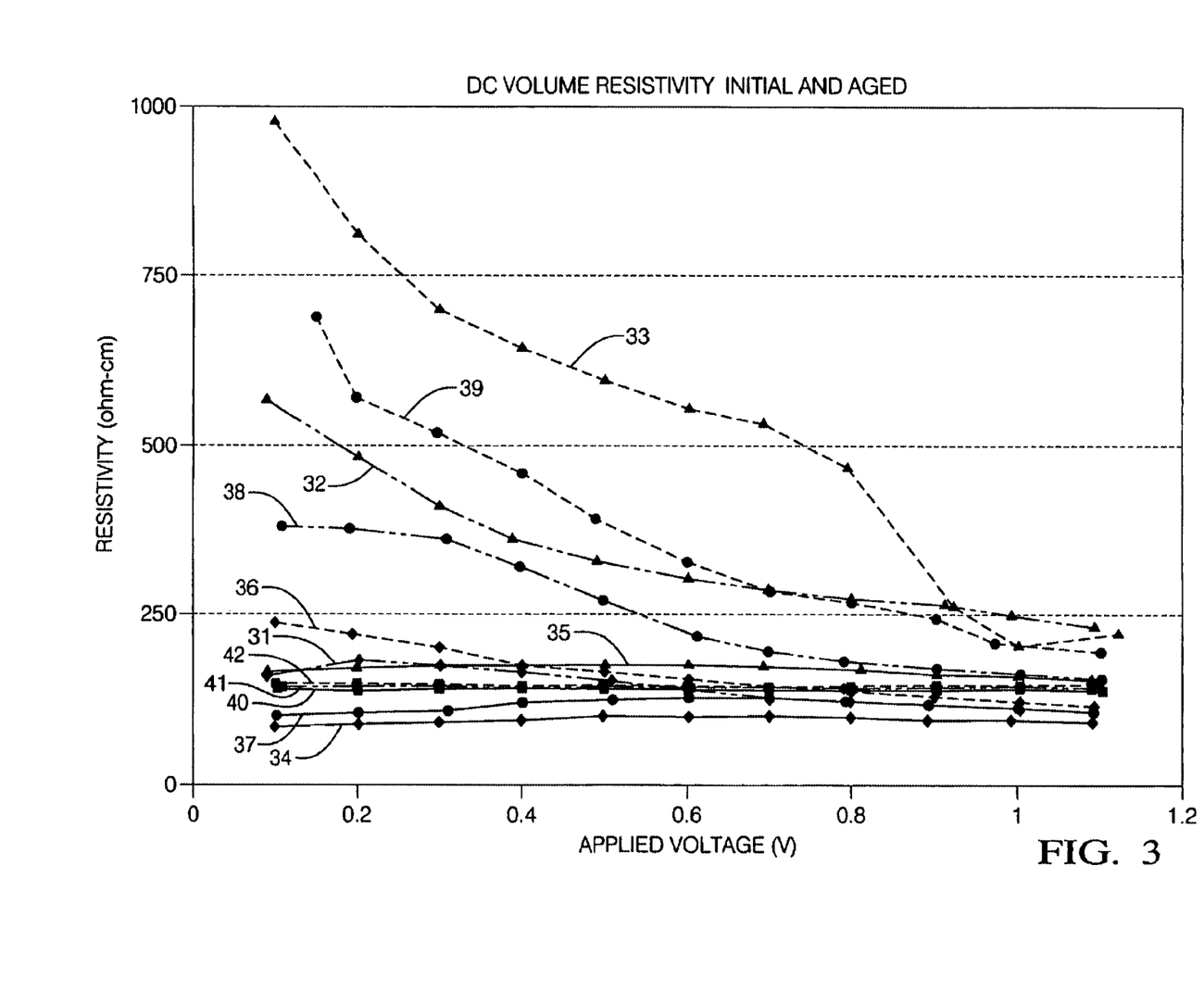
FIG. 3 is a graphical illustration of a DC volume resistivity showing a variable resistivity over an applied voltage for fresh samples and the same samples aged in 800° C. in air.

Sample 1, lines 21, 22, and 23, demonstrates a good current density and resistivity with good retention of these properties over time. This Sample, however, has no detectable level of monoclinic phase zirconia present after firing. Consequently, this Sample 1 would be plagued with the conventional problems of thermal mismatch, resulting in cracking.

Sample 5, which also demonstrates good current density and resistivity, when fired at about 1510° C. for 2 hours, contains about 15 weight % to 30 weight % monoclinic phase, as measured at room temperature by x-ray diffraction. The balance of the phase chemistry is cubic and tetragonal. With this phase chemistry, Sample 5 can be co-fired with alumina body to make a monolithic, hybrid structure. Yet, as

TABLE I

Total Slurry Formulation (g)

| Ingredient | Sample Number | | | | | | | | |
|---|---|---|---|---|---|---|---|---|---|
| | 1 | 2 | 3 | 4 | 5 | 6 | 7 | 8 | 9 |
| Yttria Stabilized Zirconia, 5 mole % | 285.5 | 214.1 | 142.8 | 71.4 | 0.0 | 214.1 | 142.8 | 71.4 | 0.0 |
| High Purity Monoclinic Zirconia[1] | 0.0 | 65.7 | 131.3 | 197.0 | 262.7 | 0.0 | 0.0 | 0.0 | 0.0 |
| Monoclinic Zirconia | 0.0 | 0.0 | 0.0 | 0.0 | 0.0 | 65.7 | 131.3 | 197.0 | 262.7 |
| High Purity Yttria | 3.0 | 8.7 | 14.4 | 20.1 | 25.8 | 8.7 | 14.4 | 20.1 | 25.8 |
| Alumina | 11.5 | 11.5 | 11.5 | 11.5 | 11.5 | 11.5 | 11.5 | 11.5 | 11.5 |
| Xylenes (solvent) | 56.4 | 56.4 | 56.4 | 56.4 | 56.4 | 56.4 | 56.4 | 56.4 | 56.4 |
| Ethanol (solvent) | 56.4 | 56.4 | 56.4 | 56.4 | 56.4 | 56.4 | 56.4 | 56.4 | 56.4 |
| Phosphate Ester Dispersant | 4.0 | 4.0 | 4.0 | 4.0 | 4.0 | 4.0 | 4.0 | 4.0 | 4.0 |
| Butyl Benzyl Phthalat Plasticizer | 13.2 | 13.2 | 13.2 | 13.2 | 13.2 | 13.2 | 13.2 | 13.2 | 13.2 |
| Polyvinyl Butyral Binder | 22.0 | 22.0 | 22.0 | 22.0 | 22.0 | 22.0 | 22.0 | 22.0 | 22.0 |

[1]contains less than about 100 ppm silicon.

TABLE II

Weight Percent Oxide

| Ingredient | Sample Number | | | | | | | | |
|---|---|---|---|---|---|---|---|---|---|
| | 1 | 2 | 3 | 4 | 5 | 6 | 7 | 8 | 9 |
| Yttria Stabilized Zirconia, 5 mole % | 95.2 | 71.4 | 47.6 | 23.8 | 0.0 | 71.4 | 47.6 | 23.8 | 0.0 |
| High Purity Monoclinic Zirconia | 0.0 | 21.9 | 43.8 | 65.7 | 87.6 | 0.0 | 0.0 | 0.0 | 0.0 |
| Monoclinic Zirconia | 0.0 | 0.0 | 0.0 | 0.0 | 0.0 | 21.9 | 43.8 | 65.7 | 87.6 |
| High Purity Yttria | 1.0 | 2.9 | 4.8 | 6.7 | 8.6 | 2.9 | 4.8 | 6.7 | 8.6 |
| Alumina | 3.8 | 3.8 | 3.8 | 3.8 | 3.8 | 3.8 | 3.8 | 3.8 | 3.8 |
| Total | 100.0 | 100.0 | 100.0 | 100.0 | 100.0 | 100.0 | 100.0 | 100.0 | 100.0 |

Formulation Samples 2 through 5 disclose preferred embodiments, with Sample 5 being most preferred. Sample 9 represents a standard oxygen sensor formulation. FIGS. 2 and 3 show comparisons of current density and DC volume resistivity, respectively, for Samples 1, 5, 6, and 9. The can be seen in FIG. 2, the current density with applied voltage is quite linear, and the linearity and magnitude is the most stable over time of the illustrated Samples (lines 24-26). One possible explanation for this behavior is the relative purity of the electrolytes; Sample 5 contains a high purity monoclinic zirconia powder that has less than 100 parts per million (ppm) silicon. Samples 6 through 9 contain between about 500 and 1,000 ppm silicon, with a relative conductivity of the zirconia phases being more tetragonal and cubic than monoclinic. The resistivity with applied voltage in FIG. 3 shows how aging and electrical energy imposed on the cell has an effect on the resistivity level. Sample 9 has a relatively flat plot initially (line 31), but after 24 (line 32) and 48 hours (line 33), the resistivity at low applied voltages is several times higher. As voltage is applied to these air aged samples, the resistivity drops closer to its initial value, around 1 applied volt. Samples 1 and 6 also show this behavior to a lesser degree (lines 34–36 and 37–39, respectively). Sample 5 is relatively flat and stable at 0 (line 40), 24 (line 41), and 48 hours (line 42).

Figure 4:
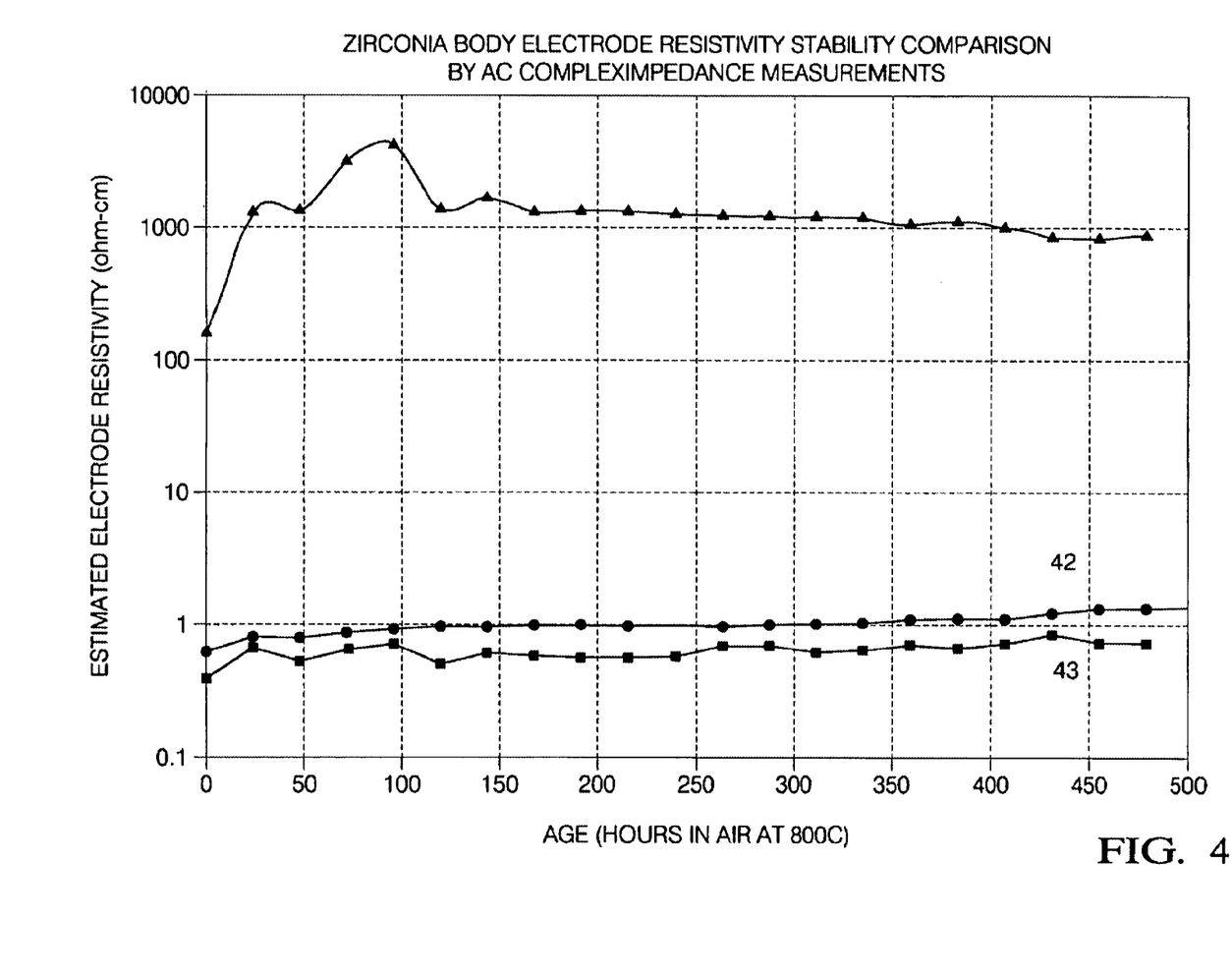
FIG. 4 is a graphical illustration of a zirconia body electrode impedance stability comparison of variable electrode impedance over time in air at 800° C.

A further illustration of the cell stability in air at 800° C. is shown in FIG. 4. FIG. 4 shows an illustration of a zirconia body electrode impedance stability comparison of electrochemical cells made from Samples 5 and 9, which were tested for over 450 hours. As can be seen, there is approximately three orders of magnitude difference in the electrode impedance. Also, Sample 5 maintains its reduced electrode impedance over time (lines 42 and 43).

Firing the cell at lower sintering temperature also further lowers the electrode impedance and enhances stability. For example, in FIG. 4, Sample 5 shows about a 10% reduction in electrode resistivity when fired at 1,450° C. rather than 1,510° C. This reduction is maintained over a 450 hour air aging time interval at 800° C.

Alternative embodiments are also possible. These include formulations having the addition of co-synthesized yttria stabilized zirconia powder while still retaining up to about 10 mole %, preferably about 5 mole %, of the total yttria content. The co-synthesized yttria stabilized zirconia increases the percent by weight of tetragonal and cubic phase in the fired zirconia body. This may increase the pumping current of the cell and effect low electrode and total cell impedance at lower temperatures. However, utilizing an excessive amount of the co-synthesized yttria stabilized material in the batch formulation (e.g., greater than about 75 weight % of the total zirconia) will result in a fired body with little or no monoclinic phase. Formulations with more than about 75 weight % of total zirconia added as co-synthesized material demonstrate weak volumetric expansion upon cooling; during the tetragonal to monoclinic polymorphic phase transformation that typically occurs as the sintered body cools from about 650° C. to about 350° C.

The disclosed invention provides several improvements. First, about 1 weight % to about 45 weight %, preferably about 15 weight % to about 30 weight %, of the zirconia body-after firing is in a monodinic phase, wherein filly stabilized or tetragonal zirconia bodies have no monoclinic phase detectable by x-ray diffraction. This enables co-firing with a high alumina body which thereby enables production of co-fired, monolithic, hybridized zirconia/alumina body structures. Second, tha cell after firing has low electrode impedance (e.g. below about 10 ohm-cm) and total bulk DC resistivity (e.g., below about 250 ohm-cm). This shortens the time to activity, reduces power consumption, and enables enhanced sensor performance (for example, enhanced range and/or sensitivity). Also, the low impedance cell has an improved stability and performance due to the purer materials utilized.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of manufacturing zirconia-alumina body, comprising:
   mixing yttria stabilized zirconia, with monoclinic phase zirconia, yttria, and alumina with a solvent to form a mixture;
   drying said mixture to farm a dried mixture;
   disposing said dried mixture adjacent to an unfired alumina body; and
   co-firing said dried mixture and said unfired alumina body to form a zirconia-alumina body, wherein said zirconia-alumina body comprises about 1 weight % to about 45 weight % monoclinic phase zirconia, based upon a total weight of said zirconia.

2. The method of manufacturing zirconia-alunuina body of claim 1, wherein said zirconia-alumina body comprises about 15 weight % to about 30 weight % monoclinic phase zirconia with the balance cubic and tetragonal phases, based upon the total weight of the zirconia.

3. The method of manufacturing zirconia-alumina body of claim 2, wherein said zirconia-alumina body comprises about 18 weight % to about 25 weight % monoclinic phase zirconia with the balance cubic and tetragonal phases, based upon the total weight of the zirconia.

4. The method of manufacturing zircoma-alumina body of claim 1, wherein said mixture and said alumina body have a sintering mismatch of less than about 5%.

5. The method of manufacturing zirconia-alumina body of claim 1, wherein said zirconia-alumina body comprises up to about 95 mole % zirconia, up to about 10 mole % yttrium oxide, and up to about 10 mole % alumina, based upon said total weight of said zirconia-alumina body.

6. The method of manufacturing zirconia-alumina body of claim 5, wherein said zirconia-alumina body comprises about 85 to about 93 mole % zirconia, about 3 to about 7 mole % yttrium oxide, and about 3 to about 7 mole % alumina, based upon said total weight of said zirconia-alumina body.

7. The method of manufacturing zirconia-alumina body of claim 1, wherein said zirconia has a total impurity amount of less than about 1,000 ppm.

8. The method of manufacturing zirconia-alumnina body of claim 7, wherein said impurities are selected from the group consisting of silica, sodium, calcium, magnesium, iron, titanium, and chlorine.

9. The method of manufacturing zirconia-alumina body of claim 8, wherein said zirconia has about 100 ppm or less of each of silica, sodium, calcium, magnesium; iron; titanium, and chlorine.

10. A method of manufacturing zirconia-alumina body, comprising:
    mixing yttria stabilized zirconia, yttzia, and alumina with a solvent to form a mixture;
    drying said mixture to form a dried mixture;
    disposing said dried mixture adjacent to an unfired alumina body; and
    co-firing said dried mixture and said unfired alumina body to form a zirconia-alumina body.

11. The method of manufacturing zirconia-alumina body of claim 10, wherein said mixture and said alumina body have a sintering mismatch of less than about 5%.

12. The method of manufacturing zirconia-alumina body of claim 10, wherein said zirconia-alumina body comprises up to about 95 mole % zirconia, up to about 10 mole % yttrium oxide, and up to about 10 mole % alumina, based upon said total weight of said zirconia-alumina body.

13. The method of manufacturing zirconia-alumina body of claim 12, wherein said zirconia-alumina body comprises about 85 to about 93 mole % zirconia, about 3 to about 7 mole % yttrium oxide, and about 3 to about 7 mole % alumina, based upon said total weight of said zirconia-alumina body.

14. The method of manufacturing zirconia-alumina body of claim 10, further comprising mixing monoclinic phase zirconia with said yttria, stabilized zirconia, said yttria, and said alumina with said solvent to form said mixture.

15. A method of manufacturing a sensor, comprising:
mixing yttria stabilized zirconia, monoclinic phase zirconia, and alumina with a solvent to form a mixture;
drying said mixture to form an unfired zirconia body,
disposing an electrode on each side of said unfired zirconia body;
connecting each electrode to an electrical lead;
disposing said unfired zirconia body adjacent to an unfired alumina body to form an unfired zirconia-alumina body, wherein one of said electrodes is disposed between said zirconia body and said alumina body; and
co-firing said unfired zirconia-alumina body to form a co-fired zirconia-alumina body comprising about 1 weight % to about 45 weight % monoclinic phase zirconia, based upon a total weight of said zirconia.

16. The method of manufacturing a sensor as in claim 15, wherein said zirconia comprises about 1,000 ppm or lower total impurities, and wherein at least one of said electrodes has a resistivity of about 10 ohm-cm or lower at 800° C. in air.

17. The method of manufacturing a sensor as in claim 16, wherein said impurities are selected from the group consisting of silica, sodium, calcium, magnesium, iron, titanium, and chlorine.

18. The method of manufacturing a sensor as in claim 17, wherein said zirconia comprises about 100 ppm or less of each of silica, sodium, calcium, magnesium, iron, titanium, and chlorine.

19. The method of manufacturing a sensor as in claim 15, wherein said mixture and said alumina body have a sintering mismatch of less than about 5%.

20. The method of manufacturing a sensor as in claim 15, wherein said zirconia-alumina body comprises up to about 95 mole % zirconia, up to about 10 mole % yttrium oxide, and up to about 10 mole % alumina, based upon said total weight of said zirconia-alumina body.

21. The method of manufacturing a sensor as in claim 20, wherein said zirconia-alumina body comprises about 85 to about 93 mole % zirconia, about 3 to about 7 mole % yttrium oxide, and about 3 to about 7 mole % alumina, based upon said total weight of said zirconia-alumina body.

* * * * *